US009824388B2

(12) United States Patent
Croy et al.

(10) Patent No.: US 9,824,388 B2
(45) Date of Patent: Nov. 21, 2017

(54) LOCATION ASSIGNMENT SYSTEM AND METHOD

(71) Applicant: POINT INSIDE, INC., Bellevue, WA (US)

(72) Inventors: Jonathan Alan Croy, Seattle, WA (US); Joshua Logan Marti, Bellevue, WA (US); Michael Moricz, Bellevue, WA (US); Mohandas Kannan, Bothell, WA (US)

(73) Assignee: Point Inside, Inc., Bellevue, WA (US)

( * ) Notice: Subject to any disclaimer, the term of this patent is extended or adjusted under 35 U.S.C. 154(b) by 642 days.

(21) Appl. No.: 14/250,094

(22) Filed: Apr. 10, 2014

(65) Prior Publication Data

US 2015/0294397 A1 Oct. 15, 2015

(51) Int. Cl.
*G06Q 30/00* (2012.01)
*G06F 17/30* (2006.01)
*G06Q 30/06* (2012.01)

(52) U.S. Cl.
CPC ..... *G06Q 30/0639* (2013.01); *G06Q 30/0603* (2013.01)

(58) Field of Classification Search
CPC .................................................. G06Q 30/0639

USPC ........................................................ 705/26.9
See application file for complete search history.

(56) References Cited

U.S. PATENT DOCUMENTS 8,407,108 B2 * 3/2013 Foltz .................... G06Q 10/087
705/22
8,923,893 B2 * 12/2014 Austin .................... H04W 4/04
367/119

OTHER PUBLICATIONS

Bachtelle, B. (Jun. 2014). How to create your micro market planogram. Automatic Merchandiser, 56, 14-16. Retrieved from http://search.proquest.com/docview/1614634607?accountid=14753.*

* cited by examiner

*Primary Examiner* — Kathleen Palavecino
(74) *Attorney, Agent, or Firm* — William H. Bollman (57) ABSTRACT

A computer system and set of routines with access to a map, a merchandizing plan, and a store catalog performs spatial matching of items to assign locations to the items; when spatial matching cannot be performed, group matching is attempted based on categories associated with the items. If group matching cannot be performed, the location of a department or of a store is assigned to the corresponding item. An error is also determined in relation to the assigned location. The assigned location and error are output, for example, to guide people to the items.

7 Claims, 8 Drawing Sheets

LOCATION ASSIGNMENT SYSTEM AND METHOD

FIELD

The present disclosure relates to the field of assigning a location to a product in a store.

BACKGROUND

Store operators often have diagrams of stores, as well as information regarding the location of products within the stores. However, the information regarding the location of products within stores is often incomplete or missing.

Store operators and third parties make software services which guide consumers to products in stores; however, these software services are hampered by incomplete or missing product location information.

DETAILED DESCRIPTION

It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. References are made herein to routines and subroutines; generally, it should be understood that a routine is a software program executed by computer hardware and that a subroutine is a software program executed within another routine. However, routines discussed herein may be executed within another routine and subroutines may be executed independently (routines may be subroutines and visa versa).

Figure 1:
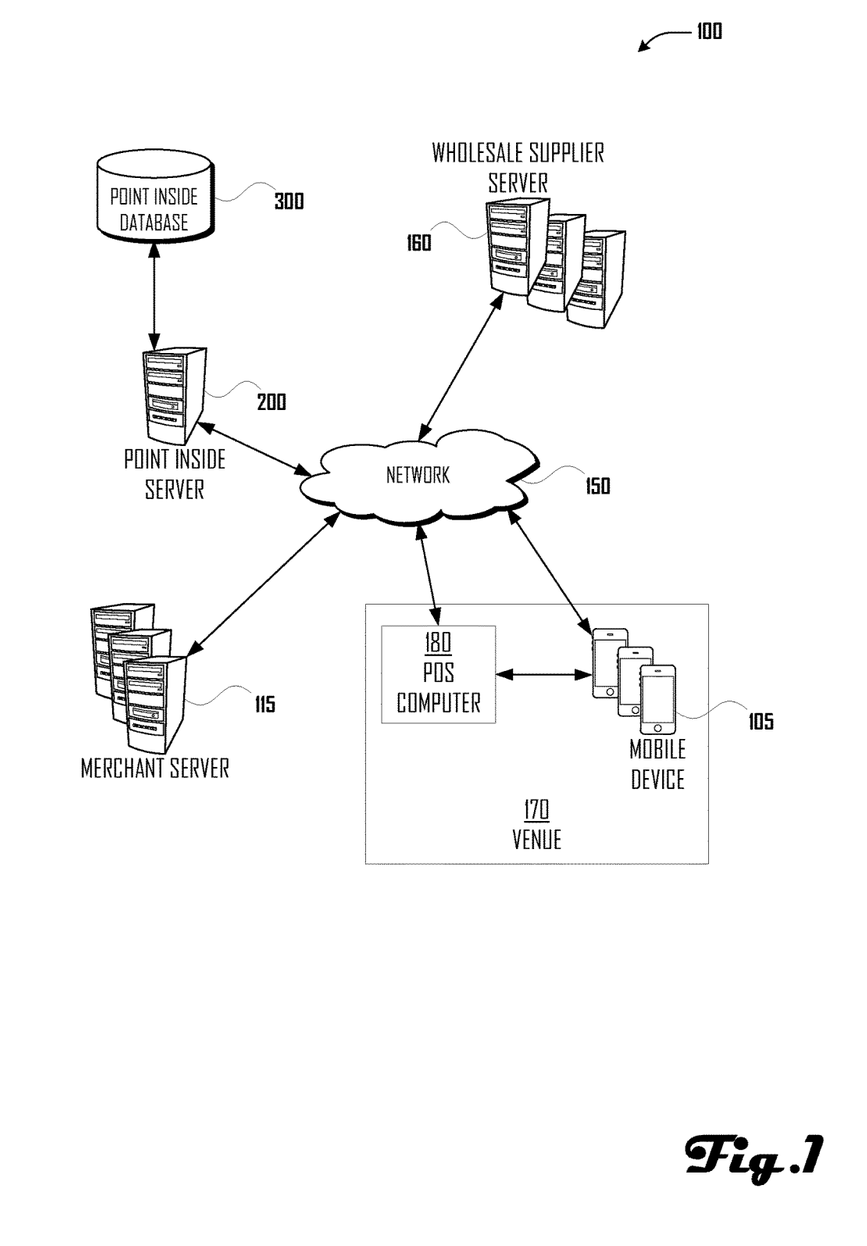
FIG. 1 illustrates a simplified product location determination diagram in which an Point Inside Server, one or more Merchant Servers, one or more Wholesale Supplier Servers, and one or more Mobile Devices are connected to a network.

FIG. 1 illustrates a simplified product location determination diagram in which an Point Inside Server 200, an Point Inside Database 300, one or more Merchant Servers 115, one or more Wholesale Supplier Servers 160, one or more Mobile Devices 105, and one or more Point of Sale ("POS") Computers 180 in a Venue 170 are connected to a Network 150. The Venue 170 may be a building, such as a store comprising merchandise items for sale, at a geographic location. The POS Computer 180 may be, for example, a computer in, controlling, or in communication with a cash register or equivalent device in the Venue 170. The Mobile Device 105 may be, for example, a mobile phone, a smart phone, a tablet computer, a laptop computer, or similar. The Merchant Server 115 and Wholesale Supplier Server 160 may be, for example, computers utilized by merchants and suppliers to merchants. The Point Inside Server 200 and Point Inside Database 300 are illustrated and discussed further in relation to FIGS. 2 and 3.

The Mobile Device 105, POS Computer 180, Merchant Server 115, Wholesale Supplier Server 160, and Point Inside Server 200 are illustrated as connecting to a Network 150. Connection to the Network 150 or direct connection between computing devices may require that the computers execute software routines which enable, for example, the seven layers of the Open System Interconnection (OSI) model of computer networking or equivalent in a wireless phone or wireless data network. The Network 150 comprises computers, network connections among the computers, and software routines to enable communication between the computers over the network connections. The Network 150 may comprise, for example, an Ethernet network and/or the Internet. Communication among the various computers and routines may utilize various data transmission standards and protocols such as, for example, the application protocol HTTP. Transmitted data may encode documents, files, and data in various formats such as, for example, HTML, XML, flat files, and JSON.

As described further herein, a Popularity Index Routine 400 executed by, for example, the Point Inside Server 200, utilizes data from the POS Computer 180, Merchant Server 115, and/or Wholesale Supplier Server 160 to calculate the number of units of different merchandise items, "Items 305," sold or obtained at the Venue 170, which result may be stored in, for example, the Popindex 315 in the Point Inside Datastore 300. An Item Location Assignment Routine 500 executed by, for example, the Point Inside Server 200, obtains an Item Catalog (which may be stored as Item Catalog 310 in the Point Inside Datastore 300), which Item Catalog 310 lists Items 305 for sale at the Venue 170 and categories or n-parent categories assigned to the Items 305. The Item Location Assignment Routine 500 may utilize a Merchandizing Plan, such as, for example, a planogram (hereinafter, "Merchandizing Plan 320"), CAD file information ("CAD 605") from, for example, the Merchant Server 115 and/or Wholesale Supplier Server 160, to attempt to assign locations within the Venue 170 to Items 305 in an Item Catalog 310. When the Item Location Assignment Routine 500 is not able to assign a location to a first Item 305 based on the Merchandizing Plan 320 and CAD 605, the Item Location Assignment Routine 500 determines one or more categories associated with the first Item 305, such as in the Item Catalog 310, determines a popular Item 305 also associated with the categories associated with the first Item 305, determines a location of the popular Item 305, and assigns the location of the popular Item 305 as the location of the first Item 305, as an Item Proxy Location 325. The Item 305 location based on the Merchandizing Plan 320 and CAD 605 or the Item Proxy Location 325 may then be output, for example to a user of the Mobile Device 105, facilitating a user in obtaining the Item 305.

This paper may discuss components as connecting to the Point Inside Server 200 or to the Point Inside Datastore 300; it should be understood that such connections may be to, through, or via the other of the two components (for example, a statement that a computing device connects with or sends data to the Point Inside Server 200 should be understood as saying that the computing device may connect with or send data to the Point Inside Datastore 300). References herein to "database" should be understood as equivalent to "Datastore." The Merchant Server 115, Wholesale Supplier Server 160, the POS Computer 180, and the Mobile Device 105 may comprise a datastore. Although illustrated in these Figures as components integrated in one physical unit, the computers, servers and databases may be provided by common (or separate) physical hardware and common (or separate) logic processors and memory components.

Figure 2:
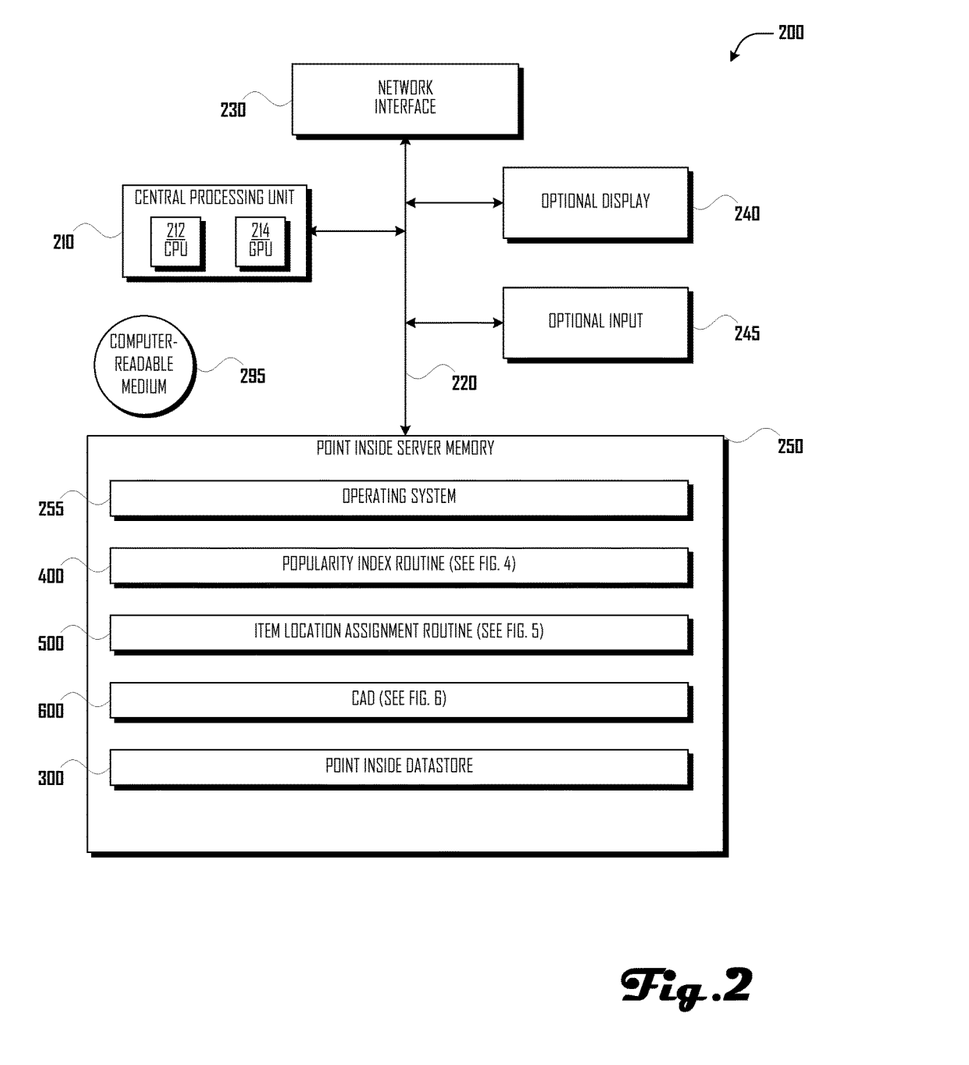
FIG. 2 is a functional block diagram of an exemplary Point Inside Server computing device and some data structures and/or components thereof.
Figure 3:
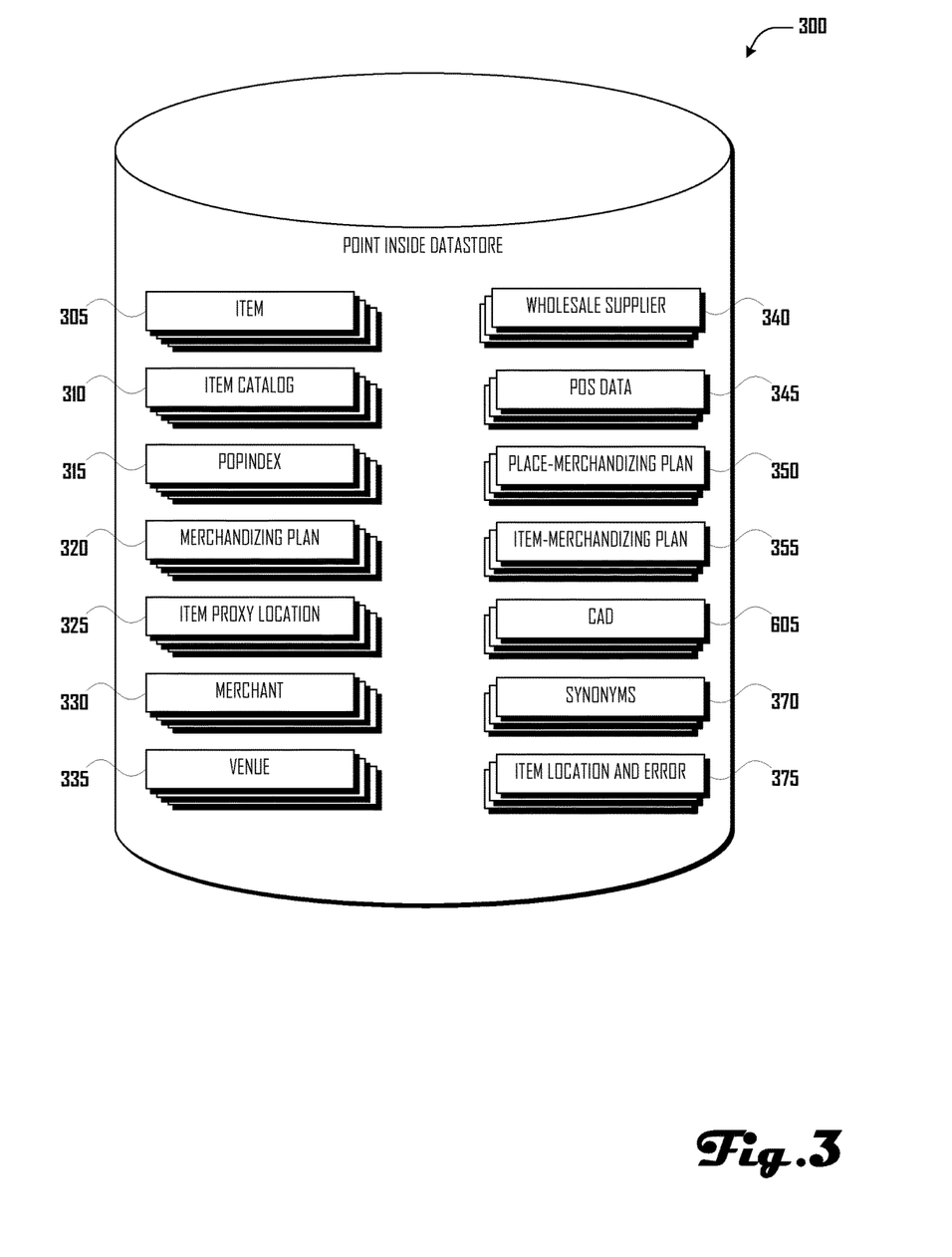
FIG. 3 is a functional block diagram of the Point Inside Datastore.

The Point Inside Server 200 illustrated in FIG. 1 is further illustrated in FIGS. 2 and 3 as comprising data groups for routines and data groups used by routines. In addition to the data groups explicitly illustrated, additional data groups may also be present on and/or executed by this device, such as routines for databases, webservers, and web browsers, and routines to enable communication with other computers. The data groups used by routines may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The browser routines may provide an interface for interacting with other computers through, for example, a webserver routine (which may serve data and information in the form of webpages). The web browsers and webservers are meant to illustrate or refer to user-interface and user-interface enabling routines generally, and may be replaced by equivalent routines for serving and rendering information to and in a user or device interface. Login credentials and local instances of user or device profiles may be stored in or be accessible to the Mobile Device 105, the Point Inside Server 200, the Merchant Server 115, and the Wholesale Supplier Server 160. Such user or device profiles may be utilized to provide secure communication between the computers.

The software routines and data groups used by the software routines may be stored and/or executed remotely relative to any of the computers through, for example, application virtualization.

FIG. 2 is a functional block diagram of an exemplary Point Inside Server 200 computing device and some data structures and/or components thereof. The computing device 200 comprises at least one Processing Unit 210, Point Inside Server Memory 250, and an optional Display 240, all interconnected along with the Network Interface 230 via a Bus 220. The Network Interface 230 may be utilized to form connections with the Network 150 and to send and receive radio frequency ("RF") and other wireless and wireline signals.

The Point Inside Server Memory 250 generally comprises a random access memory ("RAM"), a read only memory ("ROM"), and a permanent mass storage device, such as a disk drive or SDRAM (synchronous dynamic random-access memory). The Point Inside Server Memory 250 stores program code for software routines, such as, for example, a Popularity Index Routine 400 and an Item Location Assignment Routine 500, as well as browser, webserver, email client and server routines, camera, other client applications, and database applications. In addition, the Point Inside Server Memory 250 also stores an Operating System 255. These software components may be loaded from a non-transient Computer Readable Storage Medium 295 into Point Inside Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The computing device 200 may also comprise hardware supported input modalities, Input 245, such as, for example, a touchscreen, a keyboard, a mouse, a trackball, a stylus, a microphone, accelerometer(s), compass(es), RF receivers (to the extent not part of the Network Interface 230), and a camera, all in conjunction with corresponding routines.

The Point Inside Server 200 may also comprise or communicate via Bus 220 with Point Inside Server Datastore 300, illustrated further in FIG. 3. In various embodiments, Bus 220 may comprise a storage area network ("SAN"), a high speed serial bus, and/or via other suitable communication technology. In some embodiments, Point Inside Server 200 may communicate with the Point Inside Server Datastore 300 via Network Interface 230. The Point Inside Server 200 may, in some embodiments, include many more components than those shown in this Figure. However, it is not necessary that all of these (or other) generally conventional components be shown in order to disclose an illustrative embodiment.

The Point Inside Server 200 is illustrated in FIG. 2 as comprising data groups for routines, such as routines for a Popularity Index Routine 400 and an Item Location Assignment Routine 500. These routines are discussed at greater length herein. Additional data groups for routines, such as for a webserver and web browser, may also be present on and executed by the Point Inside Server 200. Webserver and browser routines may provide an interface for interacting with the other computing devices illustrated in FIG. 1, such as with the Merchant Server 115, the Wholesale Supplier Server 160, and the Mobile Device 105 (all which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

FIG. 3 is a functional block diagram of the Point Inside Datastore 300 illustrated in FIG. 2. The components of the Point Inside Datastore 300 are data groups used by routines and are discussed further herein in the discussion of other of the Figures. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. In addition to the data groups used by routines illustrated in FIG. 3, login credentials and local instances of customer and user profiles may be stored in or be accessible to all of the computing devices illustrated in FIG. 1.

The software routines and data groups used by the software routines may be stored and/or executed remotely relative to any of the computers through, for example, application virtualization.

Figure 4:
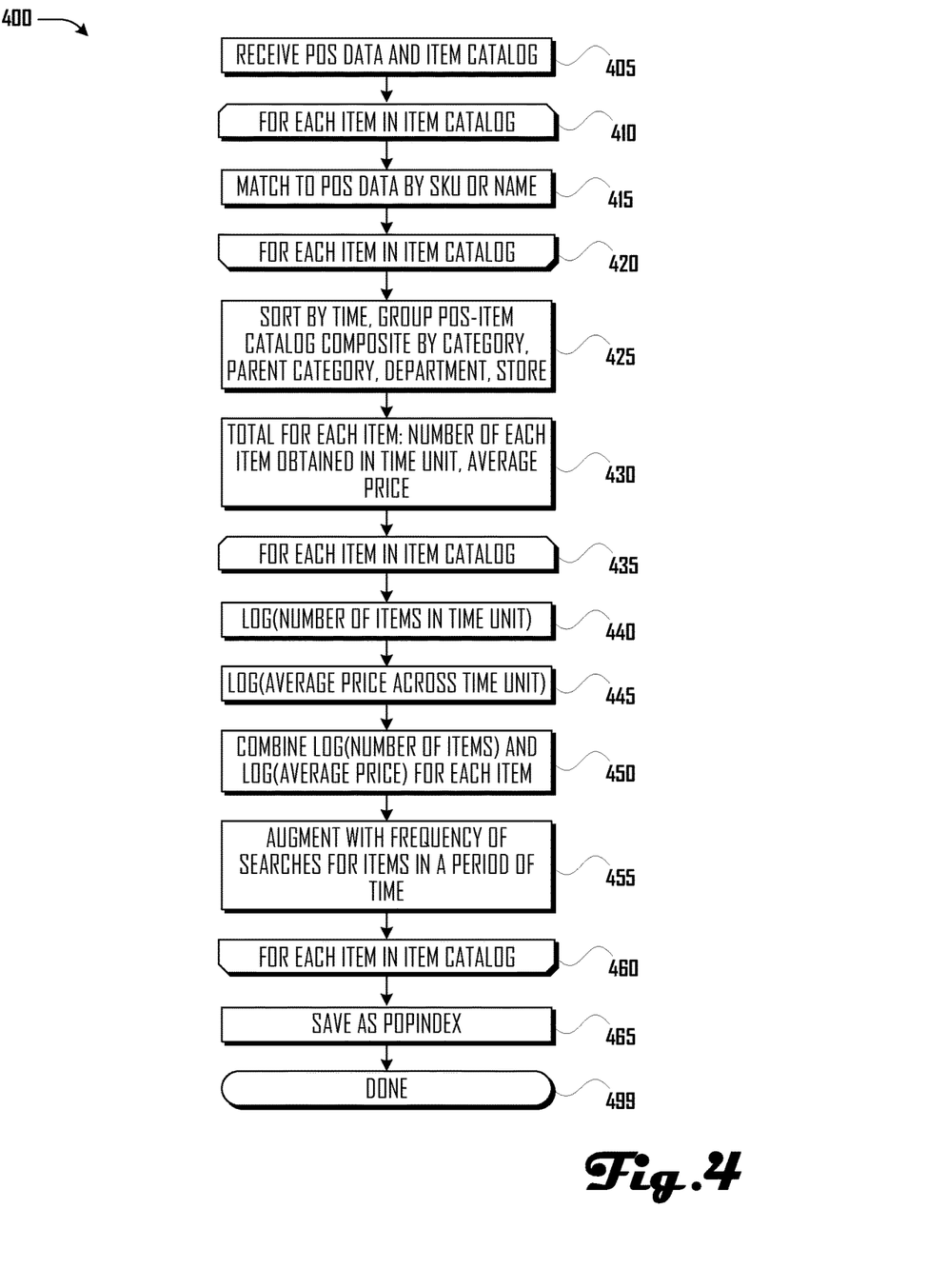
FIG. 4 illustrates a Popularity Index Routine.

FIG. 4 illustrates a Popularity Index Routine 400, which may be executed by, for example, the Point Inside Server 200. At block 405, the Popularity Index Routine 400 receives point-of-sale data from, for example, the POS Computer 180 and/or the Merchant Server 115. The point-of-sale data may be stored by the Popularity Index Routine 400 as, for example, POS Data 345. The POS Data 345 may comprise, for example, a SKU, UPC, a product name, or another unique identifier for an Item 305 as well as a price, tax, discount amounts, a date on which a transaction occurred, and a transaction identifier. At block 405, the Popularity Index Routine 400 also receives information regarding Items 305 in a store, such as Venue 170, from, for example, the Merchant Server 115 and/or the Wholesale Supplier Server 160. The information regarding Items 305 in a store may comprise, for example, a SKU, UPC, a product name, or another unique identifier for a product, whether the Item 305 is in inventory, the number of Items 305 in inventory, a category assigned to the Item 305, an n-level parent category assigned to the Item 305 or to the category of the Item 305 (Nike Air; athletic shoe; shoe; apparel; etc.), a department assigned to the Item 305, and a store or venue assigned to the Item 305. The information regarding Items 305 in a store may be stored in, for example, one or more Item Catalog 310 records.

The Item Catalog 310 may comprise columns or equivalent for: item #, name, description, image file, price, category, parent category, selling department, and the like. The categories and/or n-parent categories may be hierarchical, such as, for example, clothing/shoes/running shoes.

Blocks 410 to 420 may iterate for each Item 305 in the Item Catalog 310 or for a subset thereof.

At block 415, the Popularity Index Routine 400 may match the Item 305 in the Item Catalog 310 to the POS Data 345 according to, for example SKU, UPC, product name or other unique identifier. As used herein, "unique identifier" refers to a SKU, UPC, product name or the like which can uniquely identify an Item 305. Unique identifiers may be found in the Item Catalog 310, in the Merchandizing Plan 320, in the POS Data 345 and in data sets derived from these data sets, such as in the Popindex 315, the Place-Merchandizing Plan 350, the Item-Merchandizing Plan 355, and the Item Proxy Location 325 records. Performance of this step may be aided by a table of synonyms, or similar, such as Synonyms 370, which, for example, may equate different unique identifiers as being the same. Synonyms 370 may also be used to equate other identifiers or other data sets, such as, for example, entries in the Merchandizing Plan 320 and Map Labels in the CAD 605. More than one set of Synonyms 370 may be used in different contexts.

At block 425, the Popularity Index Routine 400 may sort the result of block 415 by, for example, date-time and may sort or group according to, for example, category, parent category, department, and store (such as if the POS data is from more than one store). At block 430, the Popularity Index Routine 400 may determine the total number of each Item 305 sold (or otherwise obtained at the venue) within a time unit, such as within a 13 month window (which window may be selected to smooth seasonal fluctuations). At block 430, the Popularity Index Routine 400 may also determine the average price of the Item 305 across the time unit.

Blocks 435 to 460 may be performed for each Item 305 in the Item Catalog 310.

At block 440, the Popularity Index Routine 400 may determine the log of the number of Item 305 obtained in the time unit, from block 430. At block 445, the Popularity Index Routine 400 may determine the log of the average price of the Item 305, from block 430. At block 450, the Popularity Index Routine 400 may combine the values from block 435 and 440. At block 455, the Popularity Index Routine 400 may augment the result of block 450 with the number of searches (or the log of the number of searches) for the Item 305 within a relatively short unit of time, such as the last day, so as to account for Items which experience a short-term surge of interest.

At block 465, the Popularity Index Routine 400 may save the result of block 450 or 455 as, for example, a Popindex 315 entry.

Figure 5A:
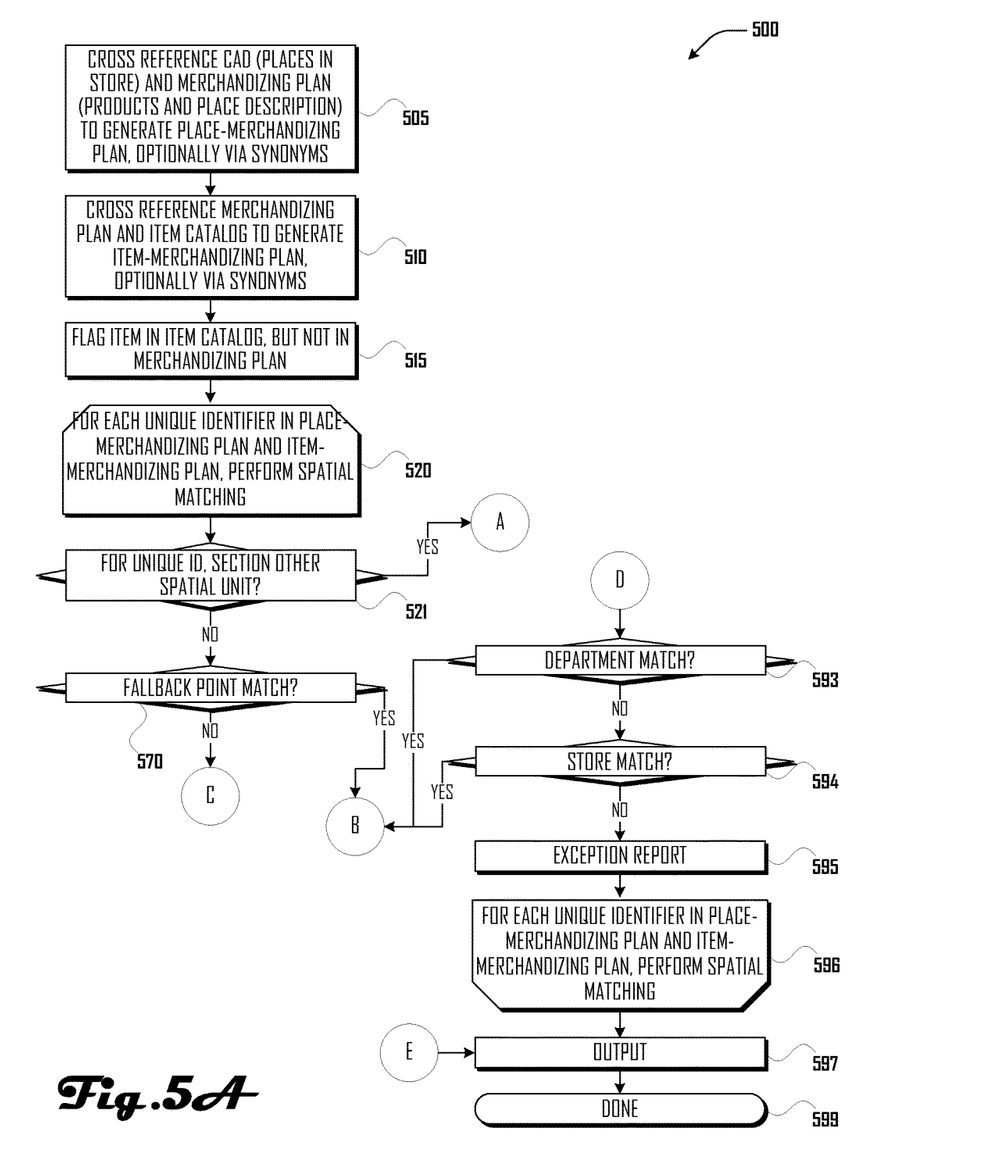
FIG. 5A-5C illustrate an Item Location Assignment Routine.
Figure 5B:
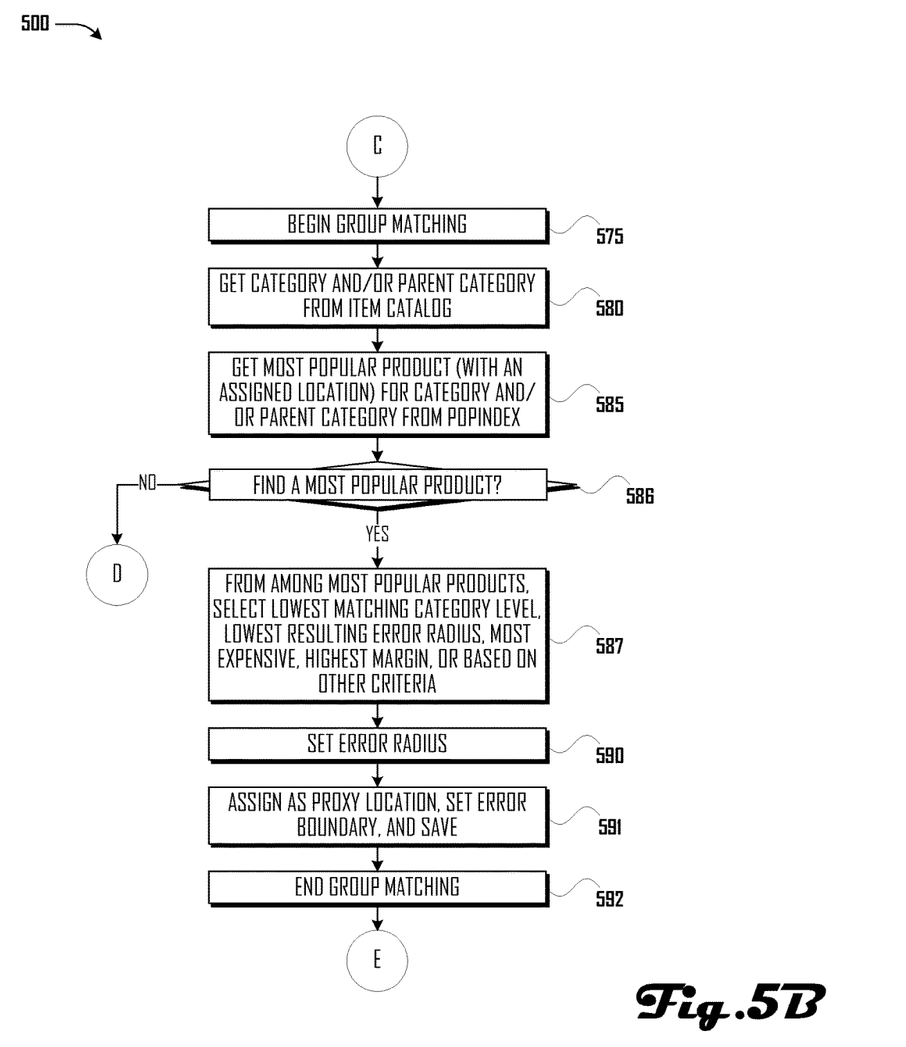
Figure 5C:
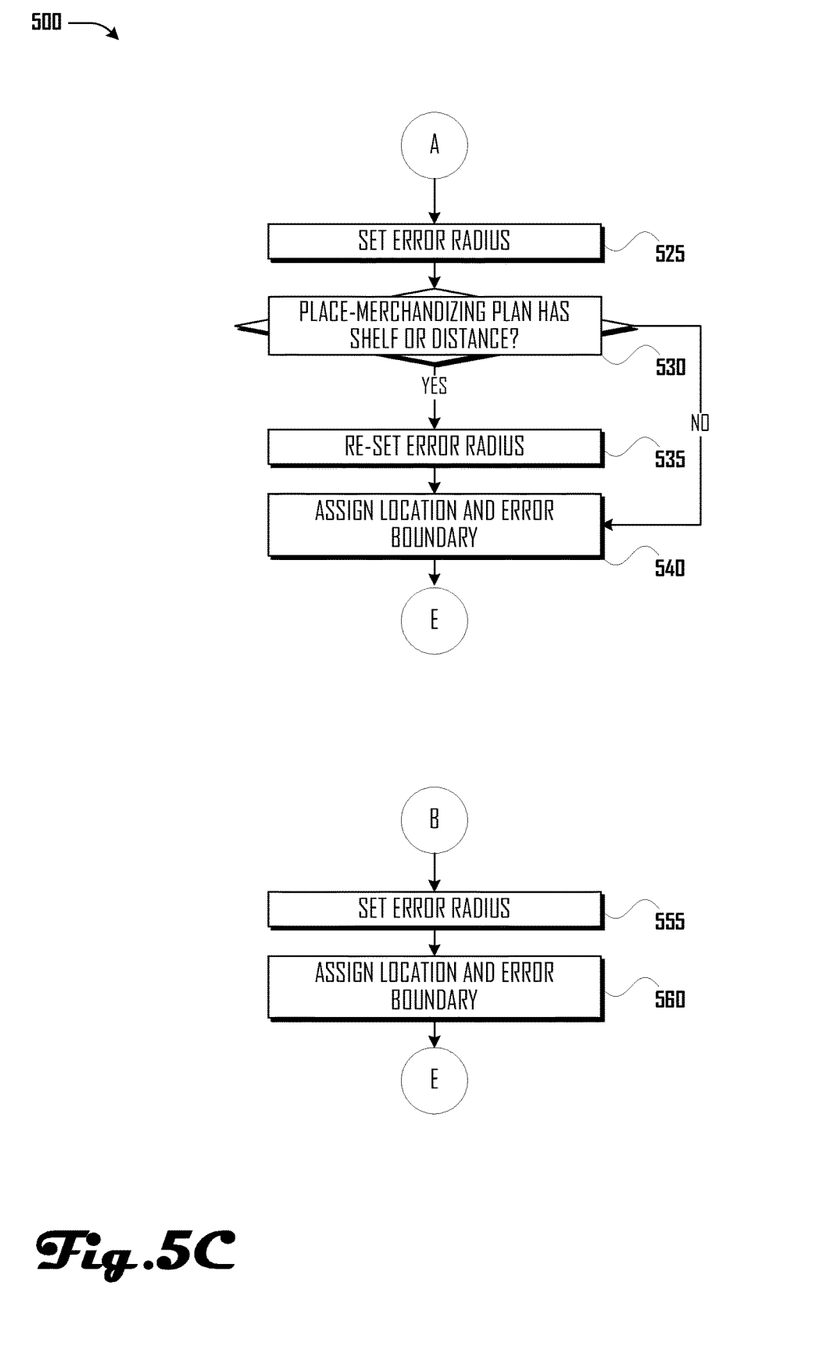

FIGS. 5A-5C illustrate an Item Location Assignment Routine 500, which may be executed by, for example, the Point Inside Server 200. At block 505, the Item Location Routine 500 cross-references a CAD diagram ("CAD") for a venue, such as Venue 170, which may be stored as CAD 605, and a Merchandizing Plan, which may be stored as Merchandizing Plan 320, to generate a Place-Merchandizing Plan 350, corresponding to items in the Merchandizing Plan at locations according to the CAD 605 and the Merchandizing Plan 320.

Figure 6:
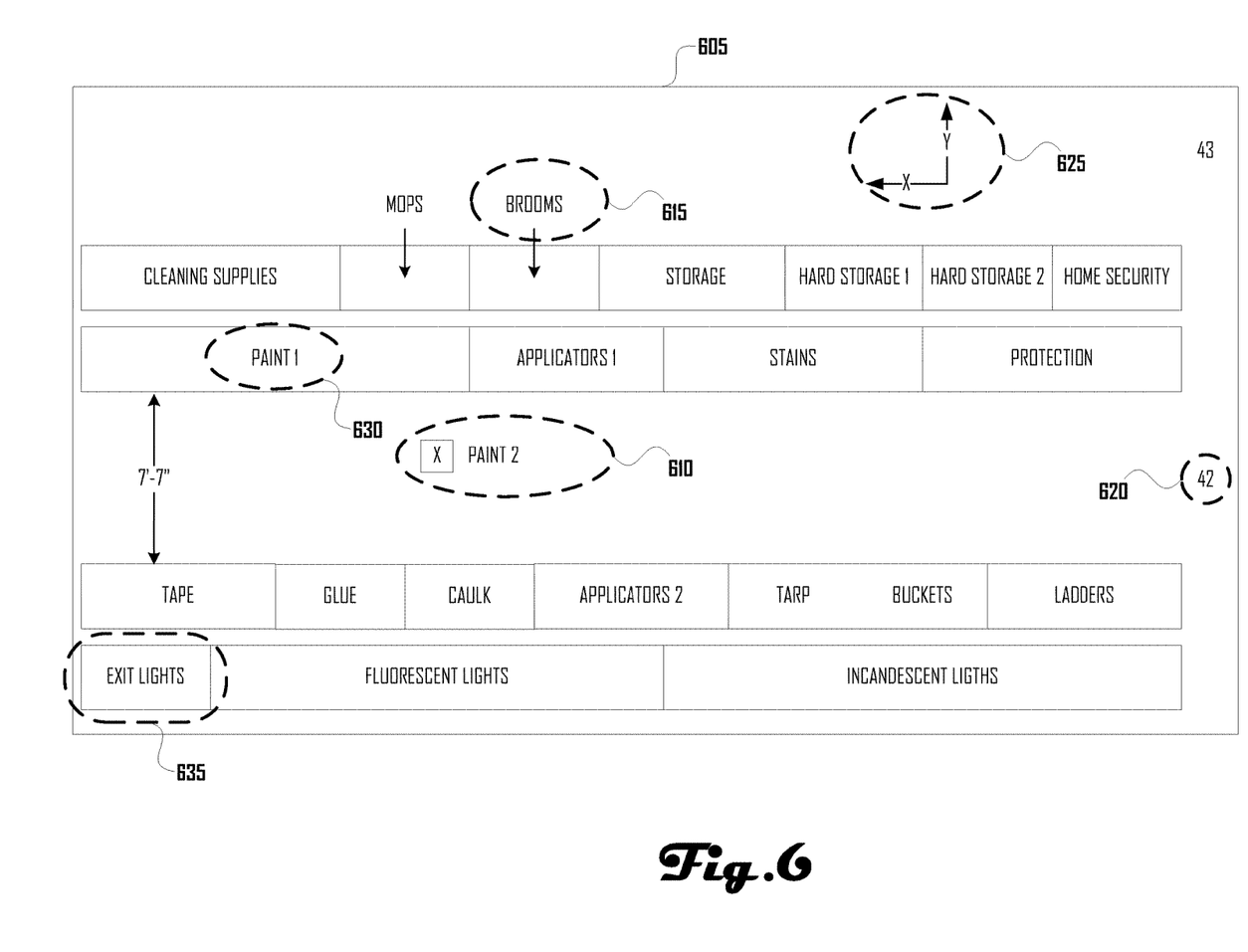
FIG. 6 illustrates a CAD drawing of a store.

The CAD 605 may comprise, for example, a dimensioned x- and y-coordinate plan view diagram of a venue. A schematic example of CAD 605 is illustrated in FIG. 6, though it will be appreciated that the CAD 605 may describe itself with text or data rather than, as illustrated in FIG. 6, graphics. The x- and y-coordinates 625 may be present in the CAD 605, may be obtained or determined, such as from the latitude and longitude of two points, or may be supplied. The x- and y-coordinates may be arbitrarily assigned or may be assigned relative to an external reference, such as another map or such as the global latitude and longitude system. Which coordinate is "x" and which is "y" may be determined according to an absolute reference, such as latitude and longitude, or may be assigned.

Relative to the coordinates in FIG. 6, the venue diagram may be divided in the y-coordinate by aisles, rows and the like, as may be represented by, for example, element 620 and the numbers 42 and 43, which may be associated with a size of the aisle, row, or the like (such as, for example, 7'-7"). The venue may be divided in the x-coordinate by bay, section, shelving units, and the like, such as for example, element 635. Certain of the divisional units may occupy y- and/or x-coordinate locations, such as a section which may occupy an entire row (a y-coordinate unit) or a portion of a row (an x-coordinate within a y-coordinate unit). The CAD 605 may further comprise z-values for layers of shelves, shelf sections, or the like (not shown in 605) and/or such z values may be represented by additional layers in the CAD 605. Components of the CAD 605 which describe the occupation of space such as rectangular units, such as element 635, areas, points, anchor points (which may indicate the starting point for measuring a distance), dimensions, identification of aisles (such as element 620), sections or bays (such as element 635) and the like shall be referred to herein as "spatial units." The spatial units in the diagram may correspond to standard units, such as a 2' or 4' lengths, 2' by 4' rectangles, and the like or may have non-standard defined dimensions.

The CAD 605 may further comprise alpha-numeric text labels associated with the spatial units, referred to herein as "Map Labels." The Map Labels may recite section or bay names or numbers, aisle or row names or numbers, item category names, codes for items, types, groups or categories of items, dimensions in the CAD, and the like. The Map Labels may be within a unit, such as element 630, or, as with element 615, may be proximate to a unit. The Map Labels may be associated with an anchor point and may indicate a corner of a Spatial Unit. Certain of the units may be non-standard and may be associated with "fallback" locations, areas, or points, such as at element 610, which may be associated with a "fallback" location at the "X" in element 610.

The association between the Map Labels and the spatial units may be according to a file which is part of, accompanies, or is associated with the CAD 605, which is created with the creation of CAD 605 or created after the fact, programmatically, and/or with human assistance.

The Merchandizing Plan 320 comprises groups of Items in, for example, a table, list, database, structured flat file, or similar. The Merchandizing Plan 320 may comprise columns or similar for entries corresponding to a store or venue identifier, such as a name or number, an identifier of a building, floor, or the like, one or more Merchandizing Group IDs (which may be or may, via a code, refer to a categorization or group of Items), an item unique identifier such as a SKU, UPC, or product name or number, a barcode or the like, and text or another character string meant to correspond with a spatial unit in a CAD (such as an anchor point, or a section), and/or a value indicating how far along the aisle, row, shelf section, or other spatial unit the item may be found. The Merchandizing Group IDs may be part of a hierarchical system, with n-parent/child Merchandizing Group IDs above/below a given Merchandizing Group ID. The Merchandizing Group IDs may refer to or be meant to correspond to physical locations in venues, such as to spatial units. An Item unique identifier may be occur in multiple rows (or equivalent) associating the Item with multiple non-overlapping Merchandizing Group IDs. Two rows from an example of a Merchandizing Plan 320 are provided in the following Table:

be aided by a table of synonyms, or similar, such as Synonyms 370, which may convert a code into text, a number, or the like (or visa versa).

In certain instances, the correlation (with or without Synonyms 370) may not obtain, such as when a Merchandizing Group ID value in the Merchandizing Plan 320 cannot be found in the Map Labels in the CAD 605.

The result of block 505 may be saved as Place-Merchandizing Plan 350.

At block 510, the Merchandizing Plan 320 and Item Catalog 310 may be cross-referenced to correlate the Items 305 in the Item Catalog 310 and the Items 305 in the Merchandizing Plan 320, such as according to the Item 305 unique identifier in the Item Catalog 310 and in the Merchandizing Plan 320. The result of block 510 may be saved as Item-Merchandizing Plan 355, which associates Items 305 and Item 305 unique identifiers in the Item Catalog 310 with the locations of groups of Items recited in the Merchandizing Plan 320

If not performed at or as a result of block 510, at block 515, Items 305 in the Item Catalog 310 but not in or not identifiable in the Merchandizing Plan 320 may be flagged or otherwise identified.

Blocks 520 through 596 perform spatial matching on Items 305 with a unique identifier in both the Item-Merchandizing Plan 355 and the Place-Merchandizing Plan 350, with a subset of these blocks, 575 through 592, performing group matching when certain of the forms of spatial matching do not obtain.

At block 521, for the then-current Item 305, a determination or equivalent may be made regarding whether the Item 305 is associated with a section or similar spatial unit in the Place-Merchandizing Plan 350. This determination may identify exceptions, such as when the Merchandizing Plan 320 identifies that the Item 305 is located a distance from a corner of a section or other spatial unit, but the CAD 605 identifies that the section or other spatial unit is shorter than the distance from the corner. Other forms of exceptions may occur, which may also result in a negative determination.

If affirmative at block 521, then referring to FIG. 5C, at block 525, the error radius for the section identified at block 521 may be set, such as according to a value determined according to cell C4 or D4 in Table 4, below. The error radius may be used to identify to a user of a service provided by the Location Assignment Routine 500 the uncertainty in the location assigned to an Item 305, such as via a radius or

TABLE 1

| (optional) Store Number | (optional) Floor ID | Merchandizing Group ID 1 | (optional) Merchandizing Group ID 2 | SKU (unique identifier) | (optional) Distance in Merchandizing Group (in units from an anchor point) |
|---|---|---|---|---|---|
| 4 | AADF3A8E-DF75-4CBC-81EF-219D7827B83E | Appliances | Section 1 | 1487835 | 40 |
| 4 | AADF3A8E-DF75-4CBC-81EF-219D7827B83E | Appliances | Section 2 | 3487653 | 120 |

During cross-referencing of the CAD 605 and the Merchandizing Plan 320 at block 505, certain of the entries in the Merchandizing Plan 320 may be found to correlate with the Map Labels in the CAD 605, such as a Merchandizing Group ID in the Merchandizing Plan 320 correlating with a Map Label in the CAD 605. Performance of this step may perimeter relative to the determined location (or relative to the center of a determined location). The error radius may be a circular radius, a non-circular area, such as a rectangular area within an aisle (as may fit within a circular radius, factoring in the shape of the venue and utilization of spatial units such as aisles), or the like.

At block 530, a determination or equivalent may be made regarding whether the Place-Merchandizing Plan 350 identifies a shelf or other z-coordinate for the Item 305 or if the Place-Merchandizing Plan 350 identifies a distance relative to the spatial unit of block 521 (which distance is allowed by the CAD 605). If affirmative, then at block 535 the error radius may be re-determined. At block 540, the determined location and error boundary may be assigned and recorded, such as in an Item Location and Error 375 record.

After block 540, the Location Assignment Routine 500 may proceed to block 597, where the Item Location and Error 375 record may be output, such as being output to a client device in response to a query for the location of an item in a venue, and then, at block 599, may conclude for the Item 305.

If negative at block 521, then at block 570, a determination or equivalent may be made regarding whether the Item 305 is associated, via the Place-Merchandizing Plan 350, with a "fallback" point. The "fallback" point may be a location identified in the Merchandizing Plan 320, CAD 605, and/or another data source which does not conform to standard units—such as sections, bays, or the like—but which may occur between or at the end of such units, such as a basket or stack of items in the middle of an aisle. An example of a fallback point is illustrated in FIG. 6 at element 610. If affirmative at block 570, then referring to FIG. 5C, at block 555, the error radius may be set, such as according to cell C6 or D6 in Table 4, below. At block 560, the determined location and error boundary may be assigned and recorded, such as in an Item Location and Error 375 record. After block 560, the Location Assignment Routine 500 may proceed to block 597, where the Item Location and Error 375 record may be output, such as being output to a client device in response to a query for the location of an item in a venue, and then, at block 599, may conclude for the Item 305.

If negative at block 570, then referring to FIG. 5B, attempts may be made to perform "group" or "category" matching between the Item 305 and other Items 305 associated with the same category, parent category, department, or store, which other Items 305 have already had a location assigned, such as Items 305 in the Item Location and Error 375 records. Blocks 575 to 592 indicate steps performed to match according to such groupings.

At block 580, the Location Assignment Routine 500 may obtain a Category, Parent Category, or n-Parent Category associated with the Item 305 in, for example, the Item Catalog 310. At this block, one or all of the n-Parent Categories associated with the Item 305 may be obtained.

At block 585, the Location Assignment Routine 500 may obtain from the Popindex 315 the most popular Item(s) 305 therein which is also associated with the Category or Parent Category (including n-Parent Category) associated with the Item 305, and which most popular Item 305 has an assigned location, as may be found by looking in, for example, the Item Location and Error 375 records.

At block 586, the Location Assignment Routine 500 may determine if at least one most popular Item 305 was found at block 585. If not, then the process may proceed to FIG. 5A and block 593. If so, then the process may proceed to block 587. The "at least one most popular Item 305" of block 585 may be the most popular Item 305, it may be two or more Items 305 which have the same popularity, and/or it may be two or more Items 305 which have a popularity in a range, within the Popindex 315.

At block 587, the Location Assignment Routine 500 may select the most popular Item 305 obtained at block 585 with the lowest matching Category level (wherein the Category system is hierarchical and the more general Categories are "higher" in the Categorical system) or may select the most popular Item 305 obtained at block 585 with the smallest resulting error radius. Alternatively, or in addition, the selection at block 587 may include a factor to preferentially select Items 305 which are more expensive, which have a higher profit margin, which have a promotional status, or based on other criteria as may be supplied by the Merchant Server 115.

At block 590, the Location Assignment Routine 500 may set the error radius for the Item 305 according to, for example, cell D8 or D9 in Table 5, depending, for example, on whether the most popular Item 305 which already has an assigned location was found in a Category, Parent Category, or n-Parent Category. Other error radius may be set for other n-Parent Categories in a like manner.

At block 591, the output of block 585 and 590 may be recorded, such as in an Item Location and Error 375 record. After block 591, the Location Assignment Routine 500 may proceed to FIG. 5A and block 597, where the Item Location and Error 375 record may be output, such as being output to a client device in response to a query for the location of an item in a venue, and then, at block 599, may conclude for the Item 305.

At block 593, if there was no result following blocks 575 to 592, the Location Assignment Routine 500 may determine a Department associated with the Item 305 in, for example, the Item Catalog 310 or the Merchandizing Plan 320. If affirmative at block 593, then referring to FIG. 5C, at block 555 the Location Assignment Routine 500 may set the error radius, such as according to cell D10 in Table 4, below. At block 560, the determined location and error boundary may be assigned and recorded, such as in an Item Location and Error 375 record. After block 560, the Location Assignment Routine 500 may proceed to block 597, where the Item Location and Error 375 record may be output, such as being output to a client device in response to a query for the location of an item in a venue, and then, at block 599, may conclude for the Item 305.

At block 594, if there was a negative result in block 593, the Location Assignment Routine 500 may determine a Store associated with the Item 305 in, for example, the Item Catalog 310 or the Merchandizing Plan 320. Referring to FIG. 5C, at block 555 the Location Assignment Routine 500 may set the error radius, such as according to cell D11 in Table 4, below. After block 560, the Location Assignment Routine 500 may proceed to block 597, where the Item Location and Error 375 record may be output, such as being output to a client device in response to a query for the location of an item in a venue, and then, at block 599, may conclude for the Item 305.

Blocks 593 and 594 may be performed regardless of whether a unique identifier is found in both the Place-Merchandizing Plan 350 and the Item-Merchandizing Plan 355.

At block 595, if there was a negative result in block 594, the Location Assignment Routine 500 may record an exception, such as to indicate that no location could be assigned to the Item 305.

Tables 2 through 6, following, illustrate spatial data regarding a Venue 170 and group matching information regarding Items 305, as well as the processing of such information to determine error radii (discussed above), specific to Venues 170 of different sizes.

Certain cells in these tables contain an alphanumeric code, such as "A1," which code may be used in other of the cells as a pointer to such cell. For example, A1 indicates that data must be input. Entries such as "A4=A2*A3," indicate that the cell is identified as "A4" and that the value of A4 is determined by multiplying A2 by A3.

Table 2 illustrates spatial data regarding a Venue 170 which may be captured or input into or determined by the Location Assignment Routine 500 relative to a retailer (or merchant).

TABLE 2

Variables (per retailer)
Spatial information (from CAD 605)

| | |
|---|---|
| Average Store size (sq ft): | A1 |
| Typical section width (ft): | A2 |
| Typical section depth (ft): | A3 |
| Average section size (sq ft): | A4 = A2 * A3 |
| Average # of sections: | A5 |
| Average # of sections/ Merchandizing Plan | A6 |
| Average # Merchandizing Plans/Department: | A7 |
| Total Section Squ. Footage | A8 = A5 * A4 |
| Merchandizing SF %: | A9 = A8/A1 |

Table 3 illustrates group matching data which may be captured or input into or determined by the Location Assignment Routine 500 relative to a retailer (or merchant).

TABLE 3

Variables (per retailer) continued
Group Matching (from Merchandizing Plan 320)

| | | Std Deviation | Highest Precision | Lowest Precision |
|---|---|---|---|---|
| Average # SKUs/store: | A10 | | | |
| Number of Categories/store: | A11 | | | |
| Average # Items/Category: | A12 = A10/A11 | B1 | C1 = IF(B1 > A12, 0, Round (A12 − B1, −1)) | D1 = Round(A12 + B1, −1) |
| Number of Parent Categories/store: | A13 | | | |
| Average # Item/Parent Category: | A14 = A10/A13 | B2 | C2 = IF(B2 > A14, 0, ROUND(A14 − B2, 0)) | D2 = ROUND(A14 + B2, −1) |
| Number of Departments: | A15 | | | |
| Average # Items/Department: | A16 = A10/A15 | B3 | C3 = IF(B3 > A16, 0, ROUND(A16 − B3, −2)) | D3 = ROUND(A16 + B3, −2) |
| SKU Density (SKUs per SF): | A17 = A10/A1 | | | |

Table 4 illustrates results of processing data by the Location Assignment Routine 500 relative to a retailer (or merchant), to determine the accuracy of an assigned location for spatially matched items.

TABLE 4

Results (per retailer)

| Match Type | Location Assignment Type | Accuracy or Error Radius (sq ft) | Accuracy or Error Radius (radial ft) |
|---|---|---|---|
| Spatial | Merchandizing Plan-Section Match | C4 = A4 | D4 = SQRT(C4/pi) |
| Spatial | Merchandizing Plan Name Match | C5 = (C4 * A6) * (1/A9) | D5 = SQRT(C5/pi) |
| Spatial | Fallback Point Match | C6 = 4 * C5 | D6 = SQRT(C6/pi) |
| Spatial | Department Name Match | C7 = C6 * A7 | D7 = SQRT(C7/pi) |

Table 5 illustrates results of processing data by the Location Assignment Routine 500 relative to a retailer (or merchant), to determine the accuracy of an assigned location for group matched items.

TABLE 5

Results (per retailer)

| Match Type | Location Assignment Type | Accuracy or Error Radius (SKU likelines) | Accuracy or Error Radius (radial ft) |
|---|---|---|---|
| Group | Most Popular match in Category | C8 = CONCAT(ROUND(A10 * A18, 0), "to", ROUND(A10 * C18, 0), "SKUs") | D8 = SQRT(((A10 * C18)/ (A17))/pi)) |
| Group | Most Popular match in Parent Category | C9 = CONCAT(ROUND(A10 * A19, 0), "to", ROUND(A10 * C19, 0), "SKUs") | D9 = SQRT(((A10 * C19)/ (A17))/pi)) |
| Group | Most popular Product in Department | C10 = CONCAT(ROUND(A10 * A20, 0), "to", ROUND(A10 * C20, 0), "SKUs") | D10 = SQRT(((A10 * C20)/ (A17))/pi)) |
| Group | Most Popular Product in Store | C11 = CONCAT(ROUND((A10) * C21, 0), "SKUs") | D11 = SQRT(((A10 * C21)/ (A17))/pi)) |

Table 6 illustrates results of processing data by the Location Assignment Routine 500 relative to a retailer (or merchant), with results which are used in Table 5.

TABLE 6

Results (per retailer), continued
Accuracy Range (% of total store sq ft)

| Location Assignment Type | Highest Precision | Average Precision | Lowest Precision |
|---|---|---|---|
| Popular match in Category | A18 = B1/A10 | B18 | C18 = D1/A10 |
| Popular Match in Parent Category | A19 = B2/A10 | B19 | C19 = D2/A10 |
| Most popular product in department | A20 = B3/A10 | B20 | C20 = D3/A10 |
| Most popular Product in store | n/a | n/a | C21 = 1.0 |

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of building a physical location computer database including complete location information for a logical mapping between items not including location information, the method comprising:
   forming a selection index including a logical column comprising a plurality of items physically present in at least one venue, the selection index further including a plurality of logical rows each associated with the logical column, the plurality of logical rows comprising
      a category ID for the mapped item,
      a parent category ID for the mapped item,
      a department ID for the mapped item,
      a store ID for the mapped item, and
      dated records indicating when the item identified in the intersecting logical column was obtained from the at least one venue,
   ranking, with a processor, the plurality of rows with respect to the logical column of the selection index based on a weighted combination of (1) a number of the items identified in the intersecting logical column sold based on the dated records, and (2) a number of searches logged for the item identified in the intersecting logical column;
   storing, with the processor, in a logical row in the physical location computer database of a sub-plurality of the items including location information, the included location information including an identity of a spatial unit physically located within the at least one venue, to form spatially matched items;
   extracting, with the processor from the selection index, for each of the remainder of the plurality of items not spatially matched, a location of a highest ranked one of the spatially matched items including an identity of a spatial unit physically located within the at least one venue, the extracted location being generated by the selection index as a respective highest ranked spatially matched one of the sub-plurality of items;
   storing in the logical row in the physical location computer database of each of a remainder of the plurality of items that are not spatially matched, the extracted location of the respective spatially matched one of the sub-plurality of items indicated by the selection index as an assigned location, to form group matched items, wherein the selection index generates a highest ranked one of the plurality of the spatially matched items within a given group having at least one common attribute to a respective item being group matched; and
   with the processor, outputting a location stored in the logical row in the physical location computer database to a remote client computer device in response to a search of the physical location computer database.

2. The method of claim 1, wherein the highest ranked one of the spatially matched items is selected based at least in part on having a lowest matching category level of the sub-plurality of items in the selection index.

3. The method of claim 1, wherein the highest ranked one of the spatially matched items is selected based at least in part on having a highest price or a highest gross margin.

4. The method of claim 1, wherein the included location information is extracted from a map-merchandizing plan associated with the at least one venue.

5. The method of claim 1, further comprising:
   determining a log of a number of each of the plurality of items obtained at the at least one venue in a unit of time for each of a group of matched items,
   determining an average price of those of the plurality of items obtained at the at least one venue in a unit of time,
   determining a log of the average price of those of the plurality of items obtained at the at least one venue in the unit of time, and
   combining the log of the number of each of the plurality of items obtained at the at least one venue in a unit of time for each of a group of matched items and the log of the average price of those of the plurality of items obtained at the at least one venue in the unit of time.

6. The method of claim 1, further comprising:
   augmenting the ranking based on a frequency of recent searches for the plurality of items.

7. A non-transient computer-readable storage medium having stored thereon instructions that, when executed by a processor, configure the processor to build a physical location computer database including complete location information for a logical mapping between items not including location information, by:
   forming a selection index including a logical column comprising a plurality of items physically present in at least one venue, the selection index further including a plurality of logical rows each associated with the logical column, the plurality of logical rows comprising
      a category ID for the mapped item,
      a parent category ID for the mapped item,
      a department ID for the mapped item,
      a store ID for the mapped item, and
      dated records indicating when the item identified in the intersecting logical column was obtained from the at least one venue,
   ranking, with a processor, the plurality of rows with respect to the logical column of the selection index based on a weighted combination of (1) a number of the items identified in the intersecting logical column sold based on the dated records, and (2) a number of searches logged for the item identified in the intersecting logical column;
   storing, with the processor, in a logical row in the physical location computer database of a sub-plurality of the items including location information, the included information including an identity of a spatial unit physically located within the at least one venue, to form spatially matched items;
   extracting, with the processor from the selection index, for each of the remainder of the plurality of items not spatially matched, a location of a highest ranked one of the spatially matched items including an identity of a spatial unit physically located within the at least one venue, the extracted location being generated by the selection index as a respective highest ranked spatially matched one of the sub-plurality of items;
   storing in the logical row in the physical location computer database of each of a remainder of the plurality of items that are not spatially matched, the extracted location of the respective spatially matched one of the sub-plurality of items indicated by the selection index as an assigned location, to form group matched items, wherein the selection index generates a highest ranked one of the plurality of the spatially matched items within a given group having at least one common attribute to a respective item being group matched; and with the processor, outputting a location stored in the logical row in the physical location computer database to a remote client computer device in response to a search of the physical location computer database.

\* \* \* \* \*